United States Patent Office 3,432,406
Patented Mar. 11, 1969

3,432,406
PHOTOCONDUCTOGRAPHIC MATERIAL AND
PROCESS OF PREPARATION
Donald R. Eastman, Rochester, N.Y., assignor to Eastman Kodak Company, Rochester N.Y., a corporation of New Jersey
No Drawing. Continuation-in-part of application Ser. No. 45,949, July 28, 1960. This application Sept. 25, 1964, Ser. No. 399,375
The portion of the term of the patent subsequent to Oct. 13, 1981, has been disclaimed
U.S. Cl. 204—18                6 Claims
Int. Cl. B44c 1/04

ABSTRACT OF THE DISCLOSURE

Novel photoconductographic elements are prepared by coating an electrically conductive support with a mixture containing zinc oxide in a polymeric binder and contacting the surface of the coating with a ferrocyanide or a ferricyanide salt.

This application is a continuation-in-part of Ser. No. 45,949 filed July 28, 1960, now U.S. Patent 3,152,969.

This invention relates to a novel photoconductographic material and to a method for preparing that material, and, more particularly, this invention relates to a novel photoconductographic material having a superficial layer of zinc ferrocyanide or zinc ferricyanide, a novel method of preparing the photoconductographic material, and the use of that material in the preparation of lithographic printing plates.

It is well known that lithographic printing plates may be prepared by an electrophotographic process whereby an electrically conductive image pattern is formed in a photoconductive layer, by exposure to a light image, and then treated electrolytically, for example, as disclosed in U.S. Patent 3,010,883, to cause the image areas to become ink-receptive and the background to become ink-repellent. While this type of process produces a usable printing plate, the plate is frequently not stable to light or storage, and furthermore the processing of the plate requires the use of expensive and complicated solutions to develop the images of deposited materials such as silver or copper.

A more recent discovery is exemplified in U.S. Patent 3,085,051 wherein the photoconductive element, prior to exposure to light, is coated with a transparent substance, which upon electrolytic treatment releases an opaque image-forming material. In this system, the coated transparent substance is an indium compound, which upon electrolysis is reduced cathodically to indium metal, and is deposited on the exposed and conducting areas of the photoconductive layer to produce a visible and ink-receptive image of indium metal. The resulting lithographic printing plate has two principal disadvantages; namely, (1) the ink-water differentiation is not satisfactory, and (2) the cost of manufacturing the photoconductographic material and using it in a duplication process is too high, principally because of the use of indium.

It is an object of this invention to provide a novel photoconductographic material which can be used to prepare copies having good image contrast. It is another object of this invention to provide a novel photoconductographic material which employs simpler and less expensive materials for its electrolytic development. It is another object of this invention to provide a photoconductographic material that can be used to prepare a lithographic printing plate exhibiting excellent ink-water differentiation. It is still another object of this invention to provide processes for preparing such photoconductographic material. Other objects will appear in the accompanying detailed description of this invention.

The above objects are accomplished by providing a photoconductive element comprising three components, (1) a conductive support layer, (2) a photoconductive central layer of zinc oxide-resin, and (3) a superficial layer of zinc ferrocyanide or zinc ferricyanide. This photoconductographic element is prepared by treating the surface of a conventional zinc oxide-resin photoconductive layer with an acid solution of potassium ferrocyanide or potassium ferricyanide which reacts with zinc to form zinc ferrocyanide or zinc ferricyanide, respectively.

The photoconductive layer of zinc oxide-resin is the conventional one used in xerography and photoconductography, comprising photoconductive zinc oxide mixed with a resin binder. The preferred resin is a 70/30 styrene/butadiene copolymer which optionally may be modified by the presence of other suitable materials such as silicones or petroleum resins. One particularly desirable blend is 80% of the above styrene/butadiene copolymer, 10% of a silicone and 10% of a petroleum resin fraction. Other organic resins are operable for this function as a binder for the zinc oxide. The resin should be transparent in the thickness employed, water-resistant, of sufficient molecular weight to be film-forming, and electrically nonconductive. Examples of such resins include polystyrene, cellulose nitrate, polyvinyl butyral, polyvinylidene chloride, chlorinated rubber, and rubber hydrochloride. The styrene/butadiene copolymer is preferred because it is inexpensive and has the most desirable combination of properties for this invention.

The zinc oxide used in this invention is that known to those skilled in this art as "French Process" zinc oxide.

The zinc oxide-resin mixture is normally a blend of three parts by weight of zinc oxide per part of resin. This ratio is not critical and may vary from about 2:1 to about 10:1 although a ratio of about 3:1 is preferred since it provides the optimum in photoconductive characteristics. The zinc oxide-resin layer may be prepared as a self-supporting layer or it may be coated on or impregnated into another supporting material such as paper, metal, glass, or plastic, which is, or may be treated to become, electrically conductive.

The superficial layer of zinc ferrocyanide or ferricyanide may be added to the photoconductive layer of zinc oxide-resin by any of a variety of methods. One procedure is to spray, dip, or spread the photoconductive layer with an acid solution (at a pH of less than 4) of a ferrocyanide or a ferricyanide, preferably potassium ferrocyanide. This treatment converts the zinc oxide at the surface of the coating to the corresponding acid-insoluble, alkali-soluble zinc ferrocyanide or zinc ferricyanide which hydrates and precipitates as a white solid having good adhesion to the photoconductive layer. This product can be dried and stored for subsequent use. It is stable indefinitely at normal room temperatures. Another procedure is to apply zinc ferrocyanide or zinc ferricyanide in the form of a slurry to the zinc oxide-resin photoconductive layer. Still another procedure is to treat the photoconductive layer with separate applications of a solution of a soluble zinc salt, e.g., zinc sulfate, and a solution of a soluble ferrocyanide or ferricyanide, e.g., potassium ferrocyanide, causing a double decomposition reaction producing zinc ferrocyanide as a precipitate.

In the operation of this invention a light image is focused on the photoconductive layer of zinc oxide-resin causing the zinc oxide to become conductive in the exposed areas. A solution of an electrolyte, such as an aqueous solution of sodium chloride, is placed in contact with the superficial layer of zinc ferrocyanide or zinc ferricyanide and an electric potential applied between the solution and the conductive support of the photoconductive layer, the solution being made positive and the support negative. The conductive, light-exposed areas of zinc oxide become cathodic, releasing hydroxyl ions from the electrolyte, and the resultant alkalinity solubilizes the zinc ferrocyanide, producing zinc ions which, in turn, are plated out on the cathodic areas as zinc metal.

The electrolyte employed in the development step of the process of this invention is any good conductor of electricity which permits the flow of ions between the anode and cathode of the electrolytic circuit. The preferred electrolytes are aqueous solutions of salts, particularly the salts of alkali metals and alkaline earth metals. Among these salts the most desirable ones are the alkaline earth carboxylates such as calcium acetate and magnesium acetate in their hydrate forms.

The following examples illustrate various embodiments of this invention, including the preferred procedures and materials. Parts and percentages are based on weight unless otherwise indicated.

EXAMPLE 1

This example illustrates the preparation of an image-recording material. A photoconductive element comprising a conductive support of aluminum foil coated with a photoconductive layer of zinc oxide-resin which is dye-sensitized. The zinc oxide-resin is a mixture of three parts of zinc oxide per part of a resin sold under the name "Pliolite" S-7. ("Pliolite" S-7 is a 70/30 copolymer of styrene/butadiene.) This element is swabbed under safelight conditions with an aqueous solution containing 5% potassium ferrocyanide trihydrate, the pH of the solution being adjusted to 2.5 with 12 N sulfuric acid. The surface of the element is then rinsed with distilled water, air dried at room temperature, and placed in contact with a silver density step tablet (0.3 log E per step). The element and the step tablet is then exposed for 5 seconds to 400 foot-candles of tungsten illumination and then developed electrolytically by stroking the surface in a single pass at a rate of 2 inches per second with a sponge saturated with a 5% aqueous solution of calcium acetate monohydrate, while the sponge is held at an electric potential of 60 volts positive DC with respect to the aluminum foil of the photoconductive element. A dense deposit of zinc, possibly mixed with some iron, covers the light-exposed areas only of the photoconductive layer, thereby forming a sharp visible image.

When this procedure is repeated in every detail except that the photoconductive material is not treated with a superficial coating of zinc ferrocyanide, there is no visible image formed on the photoconductive material after development.

EXAMPLE 2

This example illustrates the preparation of a lithographic printing plate.

A photoconductive element similar to that described in Example 1 is prepared having an aluminum foil as a conductive support for a dye-sensitized zinc oxide-resin photoconductive layer. In this instance the resin is a blend comprising 80% "pliolite" S-7 (described in Example 1), 10% Silicone SR-82, and 10% "Piccopale." This element is then treated with a potassium ferrocyanide solution similar to that of Example 1 except that the pH is adjusted to 2 with 12 N hydrochloric acid. The resulting product is then rinsed, dried, contacted with a step tablet, and illuminated as in Example 1 except that the intensity of the illumination is 200 foot-candles. The illuminated element is developed electrolytically in a frame development bath for 3 seconds in a 1% sodium chloride solution using the same potential as in Example 1. A thin dark layer of a zinc image forms on the exposed areas.

Frame development involves the use of a rectangular stainless steel frame with a base of "Teflon" fluorocarbon resin as an insulator. The frame is placed over the exposed photoconductive element, electrolyte solution is placed inside the frame covering the photoconductive element, and the potential is applied with the positive electrode being the stainless steel frame and the negative electrode being the aluminum backing of the photoconductive element.

The developed sheet is tested for operability as the plate of a lithographic printing process by wetting the sheet with a fountain solution of 1 part Repelex per 7 parts water (as described in U.S. Patent 2,393,875), followed by inking the sheet using a plastic hand roller and a greasy lithographic ink (IPI Speed King Jet Halftone Black Litho Ink). The sheet is receptive to ink in the exposed areas and repellent to ink in the unexposed areas. The inked image is transferred to a copy sheet with excellent duplication.

EXAMPLE 3

The procedure of Example 2 is repeated, except that a 2% solution of calcium acetate monohydrate is used in place of the 1% solution of sodium chloride as the electrolyte with the result that there is less shorting. Otherwise the results are substantially the same as in Example 2.

EXAMPLE 4

The procedure of Example 2 is repeated with the exception that a 5% solution of magnesium acetate tetrahydrate is used in place of the 1% solution of sodium chloride as the electrolyte and comparable results are obtained.

The foregoing description and examples are intended to be illustrative of various embodiments of this invention, which should not be construed as being limited in any fashion other than as defined in the following claims.

I claim:

1. A photoconductograph element comprising three layers, the central layer of which is a photoconductive layer comprising a mixture of zinc oxide and a substantially transparent, water-resistant film-forming organic resin binder, the lower layer of which is an electrically conductive support, and the upper layer of which is a thin, light-transmitting stratum of a compound selected from the group consisting of zinc ferrocyanide and zinc ferricyanide.

2. A photoconductographic element comprising three layers, the central layer of which is a photoconductive layer, comprising a mixture of 2–10 parts by weight of zinc oxide per part of styrene/butadiene copolymer, the lower layer of which is an electrically conductive support for said central layer, and the upper layer of which is a thin, light-transmitting stratum of a compound selected from the group consisting of zinc ferrocyanide and zinc ferricyanide.

3. A three-layered photoconductographic element consisting essentially of a central layer comprising a mixture of about 3 parts by weight of zinc oxide per part of a resin binder comprising at least 80% by weight of a 70/30 copolymer of styrene/butadiene, a lower layer of an electrically conductive support, and a thin upper layer of zinc ferrocyanide.

4. The element of claim 3 in which said lower layer is a metal.

5. The process of preparing a photoconductographic element comprising coating an electrically conductive support with a photoconductive mixture of 2–10 parts by weight of zinc oxide per part of a substantialy transparent, water-resistant, film-forming, organic resin binder, contacting the surface of the coated support with an acid solution of a compound selected from the group consisting of ferrocyanide salts and ferricyanide salts, removing any excess of said acid solution, and drying the final product.

6. The process of preparing a photoconductographic element comprising coating an electrically conductive support with a composition comprising about 3 parts by weight of zinc oxide per part of a resin binder comprising at least 80% by weight of a 70/30 copolymer of styrene/butadiene, contacting the surface of said composition with a solution of an alkali metal ferrocyanide at a pH of less than 4 for a time sufficient to permit zinc ferrocyanide to form on the surface of said composition, removing any excess of said solution and drying the resulting product.

References Cited

UNITED STATES PATENTS 3,010,883 11/1961 Johnson et al.
3,152,969 10/1964 Eastman.
3,165,458 11/1965 Harriman.

JOHN H. MACK, *Primary Examiner.*

T. TUFARIELLO, *Assistant Examiner.*